Patented Nov. 18, 1930

1,782,169

UNITED STATES PATENT OFFICE

KIYOSHI KAMITA, OF USHIGOME-KU, TOKYO, JAPAN, ASSIGNOR TO THE ASAHI GLASS COMPANY LIMITED, OF TOKYO, JAPAN

PROCESS FOR PREVENTING THE WEATHERING (ESPECIALLY CLOUDING, TARNISHING, AND LUSTERING) OF THE SURFACE OF GLASS

No Drawing. Application filed September 9, 1927, Serial No. 218,580, and in Japan October 21, 1926.

This invention relates to a process for preventing the weathering, especially clouding, tarnishing, and lustering of the surface of glass, in which an acid gas or a mixture of gases containing plenty of acid gases is caused to act upon the surface of the glass at a suitable temperature.

The aim of the invention is to increase the durability of glass against the weathering (clouding, tarnishing, and lustering) of its surface, which is caused by alkalis contained in the glass and the moisture in the air, and against other chemical actions, without interfering with the original properties, especially the transparency of the glass.

It is generally known that the surface of glass, when it is made from molten glass, is liable to be acted upon and decomposed by the moisture and carbon di-oxide in the air (weathering action) or by other chemical re-agents in a certain degree according to the chemical composition of glass, and that, when the weathering has reached a certain extent, the glass loses its transparency, sometimes is tarnished or becomes lustrous. No process has hitherto been practiced on an industrial scale for the prevention of this weathering. This invention is a process, which easily prevents this weathering by causing an acid gas to act, at a suitable temperature, upon the surface of glass which is exposed to the weathering or chemical actions.

When an acid gas or a mixture of gases containing plenty of acid gases is caused to act upon the surface of glass nearly at the temperature required for annealing, it appears that acid gases combine with the alkalis existing in the surface of the glass, thus compounds being formed according to the kinds of the component acid gases which are used. For example, in the case of using a mixture of gases containing plenty of sulphur dioxide gas or sulphur trioxide gas, the surface of glass becomes covered with white powder, which is supposed to be alkali sulphate. This white powder can easily be wiped off with a piece of wet cloth or the like. The surface of the glass thus treated contains no more alkaline ingredient, which is readily acted upon by water or other chemical re-agents. And by this treatment glass remains free from any change in its appearance and retains its transparency. The durability of such glass is found remarkably increased as compared with that of glass produced without undergoing the said treatment.

The acid gases applicable for the process of this invention are sulphur di-oxide gas, sulphur tri-oxide gas, hydrogen sulphide gas, selenium oxide gas, chlorine gas, hydrochloric acid gas, bromine gas, nitrogen oxide gas, nitric acid gas and carbon dioxide gas. Either each of these gases independently or mixtures from these gases can be used. When used as a mixture with the air or with waste gases of any kind including annealing lehr or furnace gases, concentration of each of the acid gases above-named, must be higher than that of the air of ordinary waste gases of any kind including annealing lehr or furnace gases.

Glass articles, which can be treated by the process of this invention, are sheets, plates, rods, tubes and other glass-wares of any form and any description.

The process of this invention gives the most beneficial result, when applied to the glass plate for making mirrors and any other glass articles, which loathe the weathering (clouding) of their surface.

The effect of the action of the acid gases is intensified in proportion to the degree of the treating temperature, but the proper temperature, at which no detriment is caused to the original properties and transparency of glass, is usually 300–600° C. It must not be considered, however, that any temperatures outside the said degrees are absolutely inapplicable for the purpose of this process.

The following examples will illustrate how the invention is performed, but the invention is not limited to these examples.

Example (I)

A mixture of gases, e. g. air containing sulphur di-oxide gas 3% or 5% is caused to act upon a sheet glass in course of annealing or a finished sheet glass, at 300–600° C. for about 30 minutes. As a result of the action of the sulphur di-oxide gas, white powder is formed over the surface of the glass. This powder is wiped off with a piece of wet cloth, and the process is all completed. It must be understood that the quantities of acid gases, temperature and time required for the said treatment may be increased or decreased within the possibility of attaining the aim of this process. The efficacious quantities of acid gases to be used, differ more or less according to their denominations; for instance, the proper quantity in the case of carbon di-oxide gas is 15% or up. The effect of the action of each acid gas is proportionate to its quantity used, so far as the temperature is fixed.

Example (II)

The following table is obtained from an experiment made on the soda lime glasses, which shows clearly the increased durability against the weathering of the surface of glass. Pieces of glass perfectly cleaned were put in an enclosed vessel, which was saturated with the moisture at the temperature of 60° C. After being left thus for a certain duration of time, they were found covered with an alkaline deposit, showing that the glass was weathered. This weathering was tested by Mylius' iodine eosine method and the eosine value was calculated on the basis of milligrams per square meter of the surface of glass under consideration.

The number of days mentioned in the table during which the clouding (as the result of weathering) of the surface of glass took place, is to be understood to imply that, during such number of days, (including nights) an indication of clouding remained noticeable notwithstanding that the weathering product was thoroughly wiped off with the wet cloth.

|  | Temperature °C. given for the gas treatment | Time in minutes given for the gas treatment | Days given for weathering | Eosine value Mgrs. Sq. m. | Days during which clouding took place |
|---|---|---|---|---|---|
| (1) Glass, A, type: |  |  |  |  |  |
| Without the gas treatment. | --- | --- | 8 | 63.9 | 8 |
| With sulphur di-oxide gas treatment. | 600 | 30 | 8 | 0 | No clouding. |
| (2) Glass, C, type: |  |  |  |  |  |
| Without the gas treatment. | --- | --- | 6 | 300.0 | 6 |
| With sulphur di-oxide gas treatment. | 600 | 30 | 7 | 0 | No clouding. |
| (3) Glass, F, Type: |  |  |  |  |  |
| Without the gas treatment. | --- | --- | 3 | 400.0 | 3 |
| With sulphur di-oxide gas treatment. | 600 | 30 | 7 | 0 | No clouding. |

Having now particularly described the nature of the invention and in what manner the same is to be performed, what I claim is:

A process for preventing the weathering, clouding, and tarnishing of the surface of glass which comprises treating the surface of the glass with an acid gas at a temperature between 300° C. and 600° C., the said acid gas being a mixture of gas normally present in the leer and additional acid gases.

In testimony whereof I affix my signature.

KIYOSHI KAMITA.